(12) United States Patent
Lewins et al.

(10) Patent No.: US 6,895,102 B2
(45) Date of Patent: May 17, 2005

(54) PROBABILITY WEIGHTED CENTROID TRACKER

(75) Inventors: Lloyd J. Lewins, Marina Del Rey, CA (US); Julie R. Schacht, Redondo Beach, CA (US); John E. Albus, Granada Hills, CA (US); Gillian K. Groves, Torrance, CA (US)

(73) Assignee: Raytheon Company, Waltham, MA (US)

( * ) Notice: Subject to any disclaimer, the term of this patent is extended or adjusted under 35 U.S.C. 154(b) by 741 days.

(21) Appl. No.: 09/895,957

(22) Filed: Jun. 29, 2001

(65) Prior Publication Data

US 2003/0026454 A1 Feb. 6, 2003

(51) Int. Cl.$^7$ .......................... G06K 9/00; H04N 5/225
(52) U.S. Cl. ...................... 382/103; 382/288; 348/172
(58) Field of Search ................................ 382/103, 168, 382/176, 274, 288; 348/169–172

(56) References Cited

U.S. PATENT DOCUMENTS

| | | | | |
|---|---|---|---|---|
| 4,286,289 A | * | 8/1981 | Ottesen et al. | 348/169 |
| 4,958,224 A | * | 9/1990 | Lepore et al. | 348/171 |
| 5,341,142 A | | 8/1994 | Reis et al. | 342/64 |
| 5,574,498 A | * | 11/1996 | Sakamoto et al. | 348/169 |
| 5,872,857 A | | 2/1999 | Chodos et al. | 382/103 |
| 5,878,163 A | | 3/1999 | Stephan et al. | 382/172 |
| 5,973,309 A | * | 10/1999 | Livingston | 250/203.1 |
| 6,072,889 A | | 6/2000 | Deaett et al. | 382/103 |

FOREIGN PATENT DOCUMENTS

GB          2-284-720          6/1995

OTHER PUBLICATIONS

Sun "Tracking and detection of moving point targets in noise image sequence by local maximum likelihood", IEEE, pp. 799–802 1996.*

* cited by examiner

*Primary Examiner*—Daniel Miriam
(74) *Attorney, Agent, or Firm*—Renner, Otto, Boisselle & Sklar, LLP (57) ABSTRACT

In accordance with one aspect of the present invention, a system for tracking a target is provided that includes an image sensor mounted to a gimbal for acquiring an image, wherein the image includes a plurality of pixels representing the target and a background. The system further includes a motor for rotating the gimbal and an autotracker electrically coupled to the image sensor and the motor. The autotracker includes a probability map generator for computing a probability that each of the plurality of pixels having a particular intensity is either a portion of the target or a portion of the background, a pixel processor in communicative relation with the probability map generator for calculating a centroid of the target based upon the probabilities computed by the probability map generator, and a controller in communicative relation with the pixel processor for generating commands to the motor based upon the centroid.

17 Claims, 5 Drawing Sheets

PROBABILITY WEIGHTED CENTROID TRACKER

This invention was made with Government support under Contract No. N00019-97-C-0009, awarded by The Department of the Navy. The Government has certain rights in this invention.

TECHNICAL FIELD

The present invention generally relates to centroid based imaging target trackers. More specifically, the present invention relates to an image tracker, which uses the Baysian probability that an individual pixel is part of the target as a weight when calculating the first moments of the target centroid.

BACKGROUND ART

Infrared systems are used in missile targeting systems for automatically identifying and selecting targets from background clutter, which can include weather conditions, such as fog, flares, jamming devices and other countermeasures. Typically, such a system employs thresholding to make such identification and selection. For example, the system might use a threshold in conjunction with a polarity indicator to separate the bright or dark pixels belonging to the target from the remainder of the image. Alternatively, the system may use multiple thresholds, with the target pixels having grey levels that fall between or outside the bands specified by the threshold values. These systems then calculate the target centroid using the identified target pixels weighted by either a binary weight or the difference between the intensity of the pixel and the discrete thresholds.

An example of a system that employs multiple thresholds is described in U.S. Pat. No. 5,878,163. Unfortunately, the system described therein has been found to suffer from certain drawbacks.

First, the system has difficulty modeling a complex target in which pixels representing the target have more than one range of intensities in common with the background. Second, the selection of the appropriate thresholds can be computationally expensive in systems having a large number of grey shades. Third, in the case where the target has very hot regions (e.g., a burning object), the thresholds generated or calculated by the system may jump erratically, resulting in a problem with the tracker commonly known as "break lock."

Accordingly, it would be advantageous to have a centroid tracker that does not use discrete thresholds for distinguishing target pixels from background pixels. It would also be advantageous to have a centroid tracker, which could reduce the computational expense necessary for tracking systems employing a large number of grey shades.

SUMMARY OF THE INVENTION

In accordance with one aspect of the present invention, a system for tracking a target is provided. The system includes an image sensor mounted to a gimbal for acquiring an image, wherein the image includes a plurality of pixels representing the target and a background. The system further includes a motor for rotating the gimbal, and an autotracker electrically coupled to the image sensor and the motor. The autotracker is made up of a probability map generator for computing a probability that each of the plurality of pixels having a particular intensity is either a portion of the target or a portion of the background, a pixel processor in communicative relation with the probability map generator for calculating a centroid of the target based upon the probabilities computed by the probability map generator, and a controller in communicative relation with the pixel processor for generating commands to the motor based upon the calculated centroid.

In accordance with another aspect of the present invention, a system is provided in which the probability map generator that makes up a portion of the autotracker shapes a probability map created by the autotracker in order to reduce the effect on the calculation of the centroid of those pixels that make up a portion of the background.

In accordance with still another aspect of the present invention, a system is provided wherein the pixel processor calculates a silhouette of the target based upon the probabilities computed by the probability map generator.

In accordance with still a further aspect of the present invention, a system is provided in which the autotracker includes a gate controller in communicative relation with the pixel processor. The gate controller uses the silhouette calculated by the pixel processor to size an inner gate and the centroid calculated by the pixel processor to locate the gate around the target.

In accordance with still another aspect of the present invention, a system is provided in which the gate controller positions a track gate and an outer gate in concentric relation with the inner gate, the track gate and the outer gate being a predetermined number of pixels larger than the inner gate. Further, the pixel processor calculates the number of pixels representing the target that are located in a first region between the outer gate and the track gate, the calculation being based on the probability computed by the probability map generator. The pixel processor also calculates the number of pixels representing the target that are located in a second region between the track gate and the inner gate, the calculation being based on the probability computed by the probability map generator. In accordance with this aspect of the invention, a status processor is included as part of the autotracker. The status processor is in communicative relation with the pixel processor and determines a quality of the system's track of the target based upon the silhouette and the number of pixels representing the target that are determined to be located in the first region and the second region.

In accordance with still another aspect of the present invention, a method of transitioning an imaging tracker from an initialization mode to a tracking mode is provided. The method includes the steps of maintaining an image sensor on the target through manual manipulation of the image sensor. The method also includes steps of centering a plurality of gates on an image detected by the image sensor, the image being made up of a plurality of pixels, and selecting a range of consecutive intensities for the plurality of pixels that have a probability of representing the target. Finally, the method includes the steps of generating a probability map based upon this selected range of consecutive intensities, and generating at least two histograms based upon the selected range of consecutive intensities.

In accordance with still a further aspect of the present invention, a method of tracking a target using an image captured by an image sensor is provided. The method includes the steps of computing a probability that a particular intensity of a pixel within the image is representative of the target and calculating a centroid of the target based upon the computed probability. The method further includes the step of manipulating the image sensor based upon the calculated centroid so as to maintain a line of sight of the image sensor on the target.

DISCLOSURE OF INVENTION

The present invention will now be described in detail with reference to the drawings. In the drawings, like reference numerals are used to refer to like elements throughout.

Figure 1:
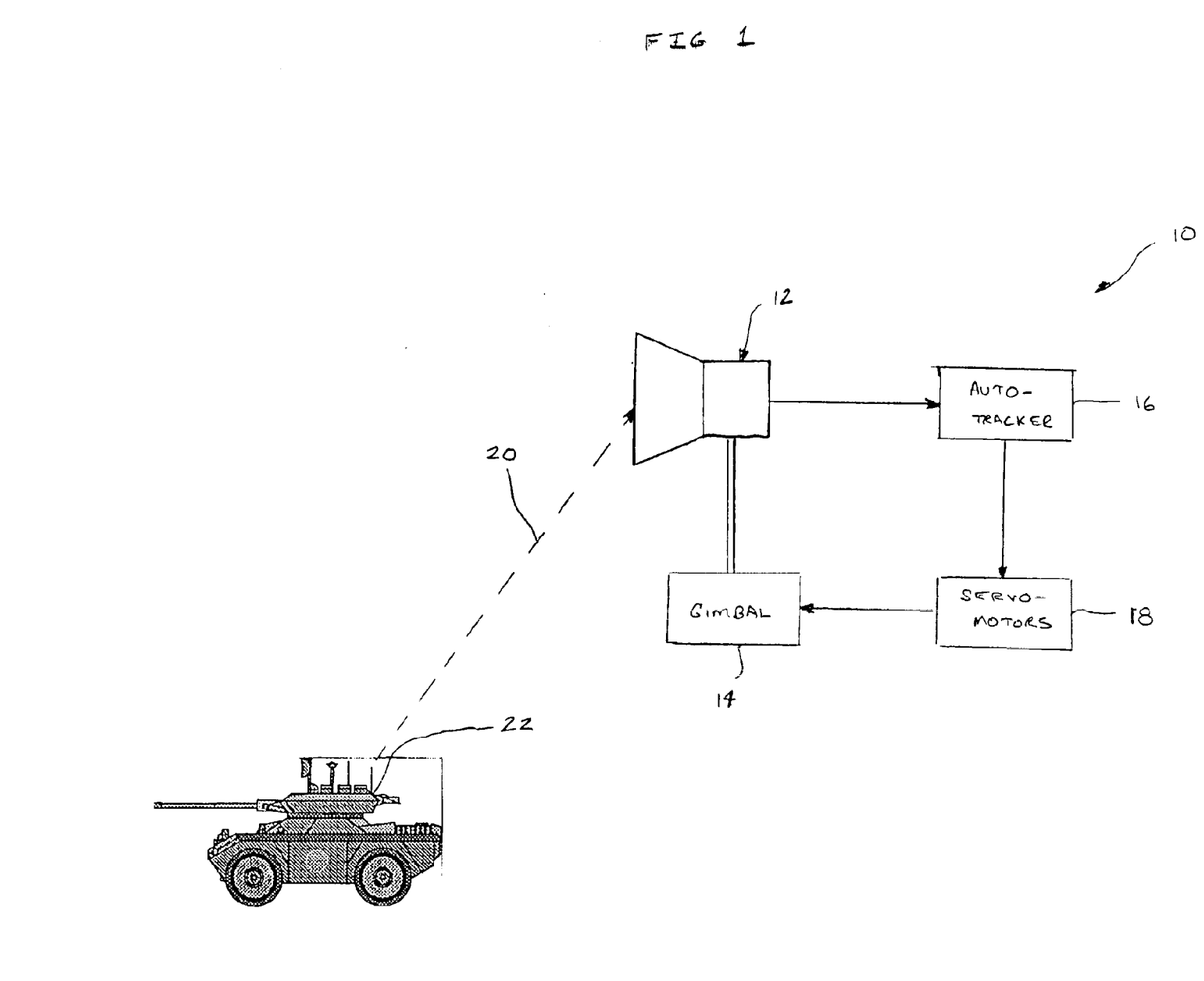
FIG. 1 is a top-level block diagram of a centroid tracking system in accordance with the present invention.

Referring to FIG. 1, a centroid tracking system 10 in accordance with the present invention is illustrated in block form. The system 10 includes a sensor 12 mounted on a gimbal 14. The system 10 further includes an autotracker 16 for maintaining a line of sight 20 of the sensor 12 on a target 22, and servo-motors 18 mechanically and electrically coupled to the gimbal 14 for providing controlled rotational movement to the gimbal 14.

In operation, the sensor 12 (e.g., an IR sensor or a TV camera) acquires an image that is made up of the target 22 and the surrounding background. The sensor 12 outputs the image to the autotracker 16. The autotracker 16, the operation of which will be described in more detail below, separates the image into pixels representing the target 22 and pixels representing the background. The autotracker 16 uses the pixels representing the target 22 to calculate a centroid of the target 22. Based on this calculated centroid, the autotracker 16 provides commands to the servo-motors 18, which rotate the gimbal 14 so as to maintain the line-of-sight 20 of the sensor 12 on the target 22.

Figure 2:
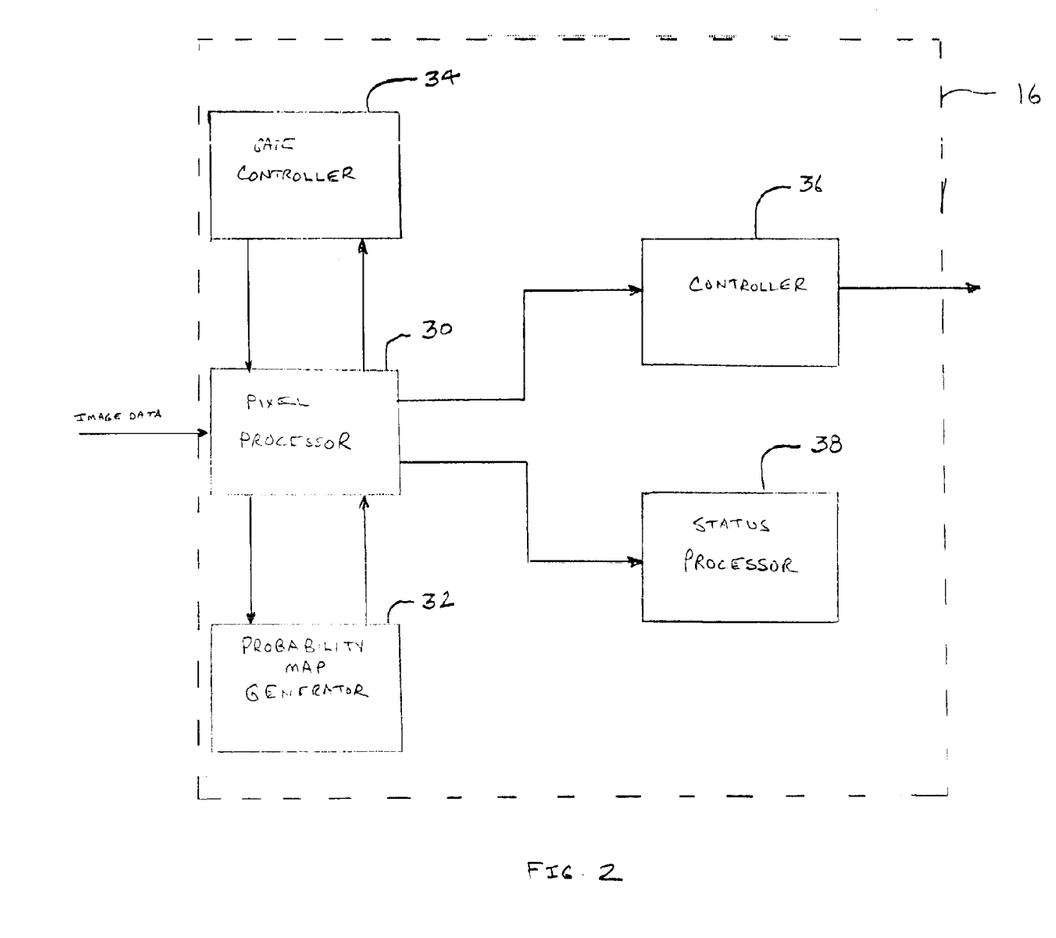
FIG. 2 is a block diagram of components of an autotracker used in a centroid tracking system in accordance with the present invention.

Referring now to FIG. 2, the functional components of the autotracker 16 are illustrated in block form. As discussed previously, the sensor 12 provides image data to the autotracker 16. The autotracker 16 is made up of 5 main functional components; a pixel processor 30, a probability map generator 32, a gate controller 34, a controller 36, and a status processor 38.

The pixel processor 30 receives the image data from the sensor 12. The pixel processor 30 performs operations on individual pixels within the image data and calculates a number of target metrics, which the other functional components of the autotracker 16 need in connection with the system's 10 operation. Specifically, the pixel processor 30 calculates a target centroid, creates pixel intensity histograms, determines a silhouette of the target 22, and counts the number of pixels likely representing the target 22 in particular regions of the received image.

The probability map generator 32 requires the intensity histograms in order to perform its functions. The pixel processor 30 provides the intensity histograms to the probability map generator 32, which uses the histograms to create a probability map. The probability map indicates or provides the probability that a pixel having a particular intensity is part of the target 22, The probability map generator 32 provides the probability map to the pixel processor 30 for use in connection with other functions the pixel processor 30 performs.

In order to perform its functions, the gate controller 34 requires the target centroid and the target silhouette. The pixel processor 30 provides these metrics to the gate controller 34. The gate controller 34 functions to size and place an inner gate 40 (illustrated in FIG. 3). Two additional gates (a track gate 42 and an outer gate 44 ), which will be used by the pixel processor 30, will be sized and placed by reference to the inner gate 40. The gate controller 34 uses the silhouette of the target 22 to size the inner gate 40. Specifically, the inner gate 40 is sized such that upon placement around the target 22, the pixels contained within the confines of the inner gate 40 substantially represent only the target 22. After the gate controller 34 has sized the inner gate 40, it uses the 30 calculated centroid of the target 22 to place the inner gate 40 around the target 22. The track gate 42 and outer gate 44 are then sized a predetermined number of pixels larger than the inner gate 40 and located concentrically around the inner gate 40 (See FIG. 3).

Figure 3:
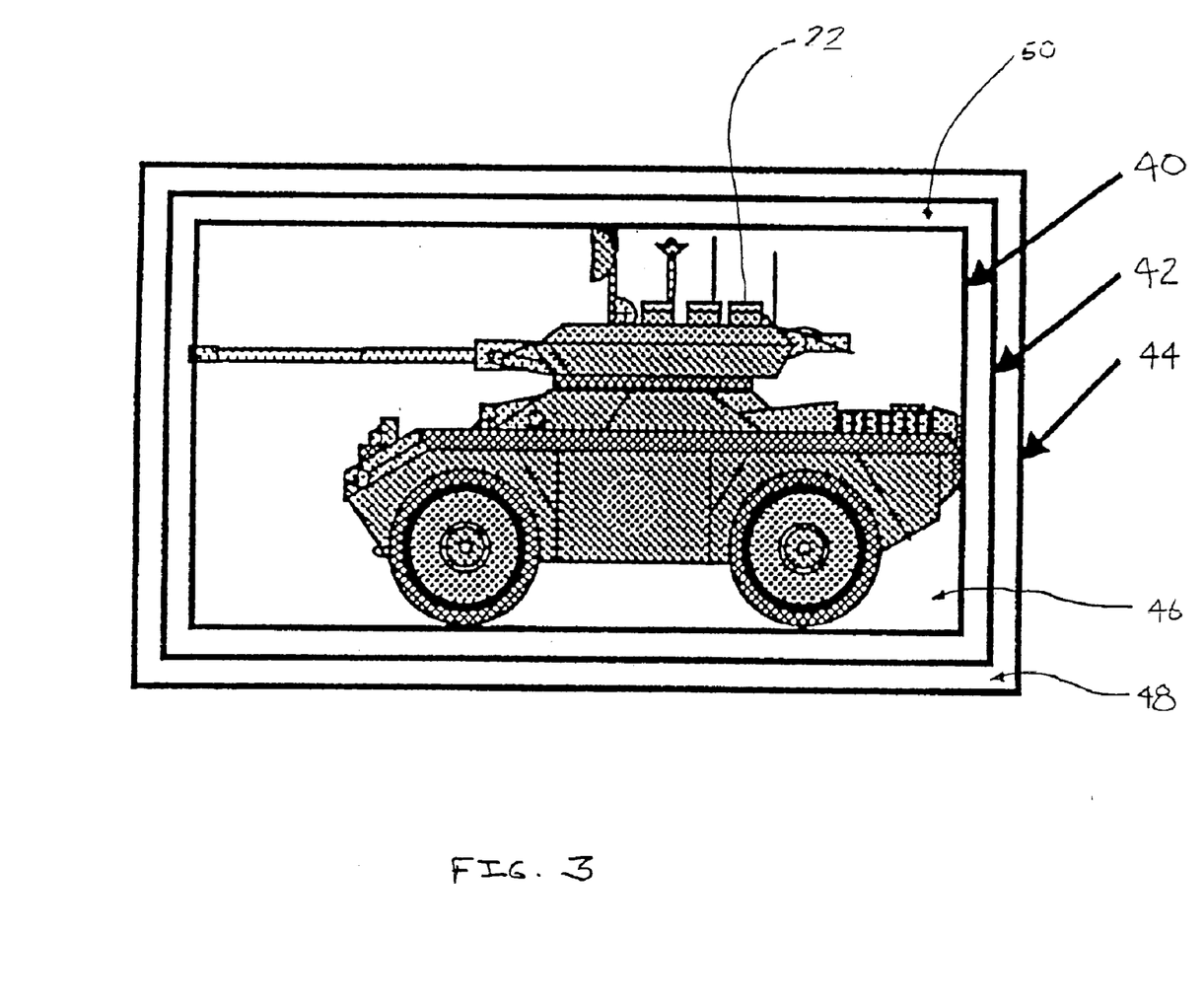
FIG. 3 is a graphical representation of a target as framed by an inner gate, a track gate, and an outer gate.

The gates 40, 42, and 44 form therebetween an inner region 46, an outer region 48, and a track region 50. The inner region 46 is made up of pixels located within the inner gate 40. The outer region 48 is made up of pixels located between the track gate 42 and the outer gate 44. The track region 50 is made up of pixels located within the track gate 42, including those pixels within the inner region 46. The pixel processor 30 counts the number of pixels in both the track region 50 and the outer region 48 that are likely to be part of the target 22. The pixel processor 30 then provides these counts along with the silhouette of the target 22 to the status processor 38. The status processor 38 uses the counts and the silhouette to determine the status (i.e., good, fair, poor) of the track. In other words, since the objective is to keep the target 22 fully within the track gate 42, if it is determined that there are a large number of target pixels within the track region 50 and only few target pixels in the outer region 48, then the status processor 38 knows that the track is good. On the other hand, if it is determined that a large number of target pixels are located in the outer region 48 and only few target pixels within the track region 50, then the status processor 38 knows that the track is fair or poor.

The pixel processor 30 also provides the calculated centroid to the controller 36. The controller 36 is in communicative relation with the servo-motors 18. The controller 36 uses the calculated centroid to generate commands to the servo-motors 18, thereby causing the servo-motors 18 to rotate the gimbal 14 and hence the sensor 12. In this manner, the autotracker 16 is able to maintain the line-of-sight 20 of the sensor 12 on the target 22.

In one embodiment of the present invention, the gate controller 34 controller 36, and status processor 38 are implemented on a single microprocessor. However, one skilled in the art will recognize that the functions could be implemented on multiple microprocessors should that prove more efficient or effective.

Figure 4:
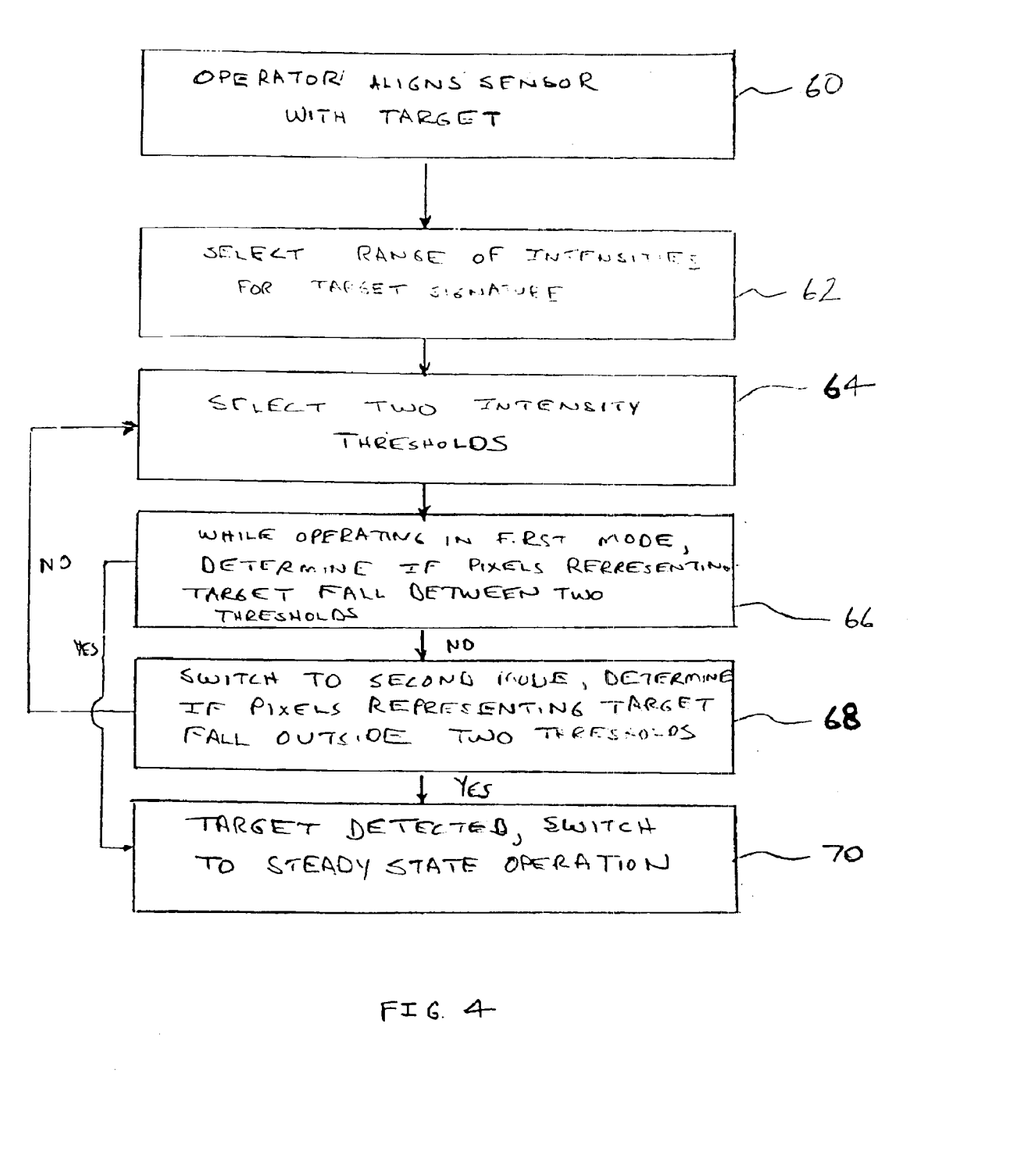
FIG. 4 is a flow diagram of a method of initializing a centroid tracking system in accordance with the present invention.

Turning now to FIG. 4, the initialization procedures for the system 10 are more fully described. As indicated in step 60, the operator manually positions the line-of-sight 20 of the sensor 12 on the target 22. Next, the autotracker 16 selects a range of consecutive pixel intensities, which are likely to form a signature of the target 22 (See step 62). In step 64, the range of intensities is bounded by selection of two intensity thresholds, $T_l$ and $T_h$. The autotracker then switches between a first mode of operation (coined the "interior mode") and a second mode of operation (coined the "exterior mode"). As indicated in step 66, while operating in the first mode or interior mode, the autotracker 16 determines whether or not pixels representing the target 22 have intensities that fall between thresholds $T_l$ and $T_h$. As is indicated in step 68, while operating in the second or exterior mode, the autotracker 16 determines whether or not pixels representing the target 22 have intensities that fall outside the selected thresholds $T_l$ and $T_h$.

If the condition of step 66 is satisfied, then the autotracker 16 jumps to step 70. As is indicated in step 70, the autotracker 16 determines that the target 22 has been detected and enters steady state operation. In order to enter steady state operation, the autotracker 16 creates an initial probability map and smoothed histograms. Specifically, the autotracker 16 will use the following equations to create the probability map ($P_s(k)$), the histogram for the inner region 46 ($H^I_s(k)$) and the histogram for the outer region 48 ($H^O_s(k)$):

$$P_s(k) = \begin{cases} k < T_l \Rightarrow 0 \\ T_l \leq k \leq T_h \Rightarrow 1 \forall k \in \{0 \cdots \Delta - 1\} \\ k > T_h \Rightarrow 0 \end{cases}$$

$$H^I_s(k) = \begin{cases} k < T_l \Rightarrow 0 \\ T_l \leq k \leq T_h \Rightarrow \frac{A_n}{T_h - T_l + 1} \forall k \in \{0 \cdots \Delta - 1\} \\ k > T_h \Rightarrow 0 \end{cases}$$

$$H^O_s(k) = \begin{cases} k < T_l \Rightarrow \frac{A_n}{\Delta - 1 - T_h + T_l} \\ T_l \leq k \leq T_h \Rightarrow 0 \forall k \in \{0 \cdots \Delta - 1\} \\ k > T_h \Rightarrow \frac{A_n}{\Delta - 1 - T_h + T_l} \end{cases}$$

If the condition in step 66 is not satisfied, the autotracker proceeds to step 68. If the condition of step 68 is satisfied, then the autotracker 16 again moves to step 70, determining that the target 22 has been detected. The autotracker 16 again enters steady state operation by creating the initial probability map and smoothed histograms. In this case, however, the autotracker 16 creates the probability map and smoothed histograms while operating in the second mode. Therefore, as opposed to using the equations set forth above, the autotracker 16 will use the equations below to create the probability map ($P_s(k)$), the histogram for the inner region 46 ($H^I_s(k)$) and the histogram for the outer region 48 ($H^O_s(k)$):

$$P_s(k) = \begin{cases} k < T_l \Rightarrow 1 \\ T_l \leq k \leq T_h \Rightarrow 0 \forall k \in \{0 \cdots \Delta - 1\} \\ k > T_h \Rightarrow 1 \end{cases}$$

$$H^I_s(k) = \begin{cases} k < T_l \Rightarrow \frac{A_n}{\Delta - 1 - T_h + T_l} \\ T_l \leq k \leq T_h \Rightarrow 0 \quad \forall k \in \{0 \cdots \Delta - 1\} \\ k > T_h \Rightarrow \frac{A_n}{\Delta - 1 - T_h + T_l} \end{cases}$$

$$H^O_s(k) = \begin{cases} k < T_l \Rightarrow 0 \\ T_l \leq k \leq T_h \Rightarrow \frac{A_n}{T_h - T_l + 1} \forall k \in \{0 \cdots \Delta - 1\} \\ k > T_h \Rightarrow 0 \end{cases}$$

If neither of the conditions in steps 66 and 68 are satisfied, then the autotracker 16 increases the size of the inner gate 40 and returns to step 64 in its operation.

The probability map that is initially generated in accordance with the above process is considered "crisp." In other words, the probability that a particular pixel intensity is part of the target is assigned a value of either one or zero. In this case, the initial centroid and silhouette calculated by the pixel processor 30 will default to the traditional binary weighted centroid. However, as will become clearer from the discussion that follows, the probability map will decay smoothly to steady state, thereby enabling the pixel processor 30 to perform its calculations in accordance with the techniques of the present invention.

Figure 5:
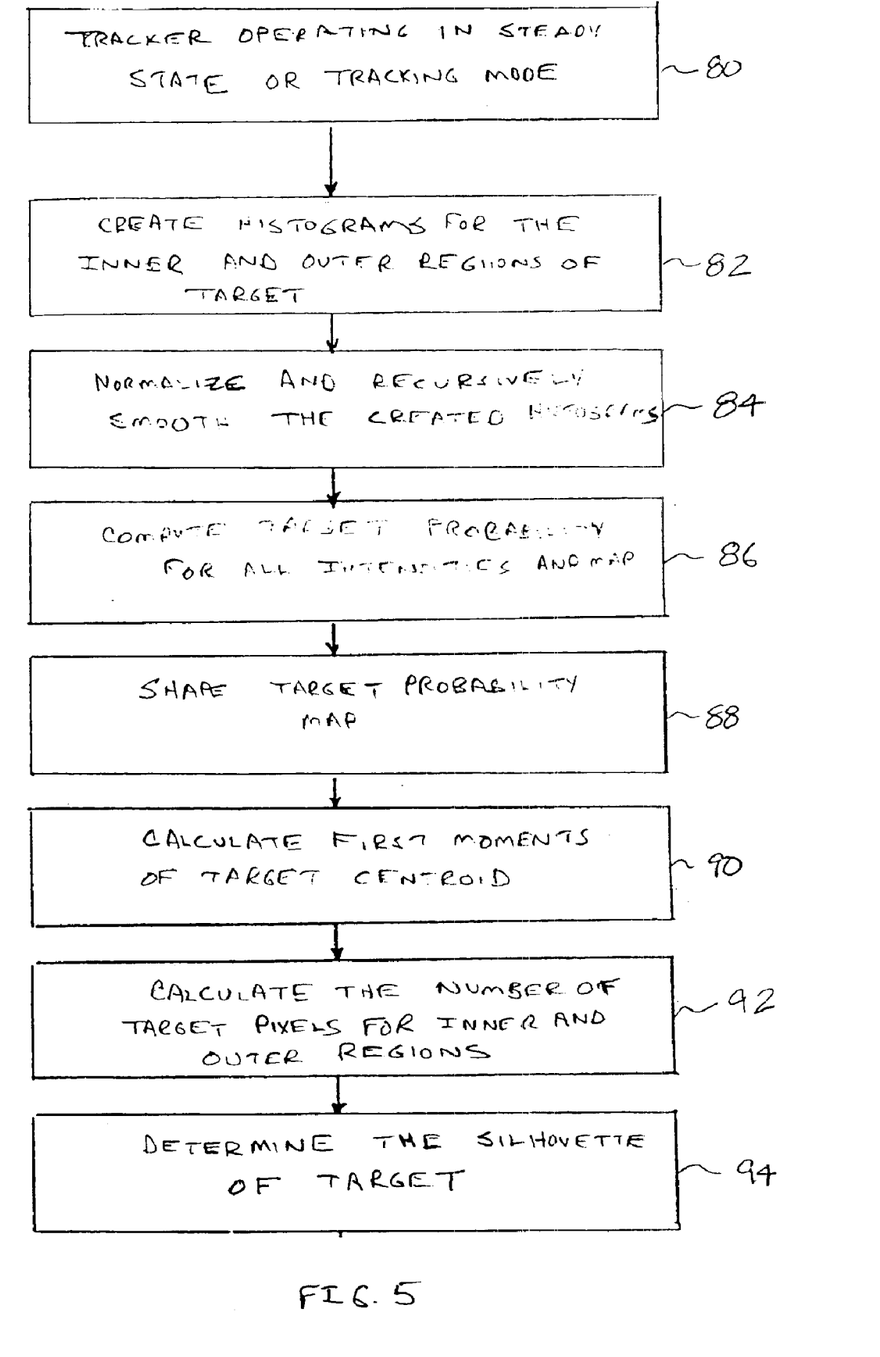
FIG. 5 is a flow diagram of the tracking operation of a centroid tracking system in accordance with the present invention.

Referring now to FIG. 5, the steady state operation of the autotracker 16 will be described in greater detail. As discussed above, after the autotracker 16 has determined that the target 22 has been detected, it commences operating in the steady state or tracking mode (step 80). In step 82, the autotracker 16 calculates the histograms for the inner region 46 and the outer region 48. The inner histogram $H^I_r$ is a function that maps a particular intensity to the number of image pixels at that intensity within the inner region 46. Similarly, the outer histogram $H^O_r$ is a function that maps a particular intensity to the number of image pixels at that intensity within the outer region 48. Examples of the functions for the inner and outer histograms can be found respectively in the equations below. In these equations, it is assumed that the inner gate 40 extends from row $R^I_t$ to row $R^I_s$ and from column $C^I_l$ to $C^I_r$. It is further assumed that the outer gate 44 extends from row $R^O_t$ to row $R^O_b$ and from column $C^O_l$ to column $C^O_r$. Finally, it is assumed that the track gate 42 extends from row $R^T_t$ to row $R^T_b$ and from column $C^T_l$ to $C^T_r$.

$$H^I_r(k) = \sum_{r=R^I_t}^{R^I_b} \sum_{c=C^I_l}^{C^I_r} \begin{cases} I_{r,c} = k \Rightarrow 1 \\ I_{r,c} \neq k \Rightarrow 0 \end{cases} \forall k \in \{0 \cdots \Delta - 1\}$$

$$H^O_r(k) = \sum_{r=R^O_t}^{R^O_b} \sum_{c=C^O_l}^{C^O_r} \begin{cases} I_{r,c} = k \Rightarrow 1 \\ I_{r,c} \neq k \Rightarrow 0 \end{cases} -$$

$$\sum_{r=R^T_t}^{R^T_b} \sum_{c=C^T_l}^{C^T_r} \begin{cases} I_{r,c} = k \Rightarrow 1 \\ I_{r,c} \neq k \Rightarrow 0 \end{cases} \forall k \in \{0 \cdots \Delta - 1\}$$

Moving to step 84, the inner and outer histograms calculated in step 82 are next normalized and recursively smoothed. The normalization process is performed in order to ensure that the relative proportions of pixel counts at particular intensities persist over time despite potential changes in the size of the track gate. First, the areas of the inner and outer regions, respectively $A_I$ and $A_O$, are calculated according to the equations below:

$$A_I = \sum_{k=0}^{\Delta - 1} H^I_r(k)$$

$$A_O = \sum_{k=0}^{\Delta - 1} H^O_r(k)$$

The autotracker 16 then uses the calculated areas for the inner and outer regions to normalize the inner and outer histograms ($H^I_n(k)$ and $H^O_n(k)$) in accordance with the following equations, where the nominal region area, which is represented by the symbol $A_n$, is an established parameter of the system 10:

$$H_n^I(k) = \frac{A_n}{A_I} H_r^I(k) \forall k \in \{0 \ldots \Delta-1\}$$

$$H_n^O(k) = \frac{A_n}{A_O} H_r^O(k) \forall k \in \{0 \ldots \Delta-1\}$$

The normalized inner and outer histograms are then recursively smoothed to form smoothed histograms $H^I_s$ and $H^O_s$. The smoothing process is performed for 2 reasons. First, it reduces the effect of noise on the tracking operation. Second, it enables the system 10 to temporarily ignore clutter within the inner gate 40, which causes sudden changes in pixel intensities within the inner gate 40. The smoothing process is accomplished using the normalized histograms of the current frame ($_\tau H$) and the smoothed histograms ($_{\tau-1}H$) from the prior image frame. The equations to perform the smoothing function are set out below. As with the nominal region area, the symbol $\alpha$ is an established system parameter, which is representative of how quickly an alpha filter, a component of the autotracker 16, responds to change. In other words, $\alpha$ can be considered a time constant of the alpha filter.

$$_\tau H_s^I(k) = (1-\alpha)_{\tau-1} H_s^I(k) + \alpha_\tau H_n^I(k) \ \forall k \in \{0 \ldots \Delta-1\}$$

$$_\tau H_s^O(k) = (1-\alpha)_{\tau-1} H_s^O(k) + \alpha_\tau H_n^O(k) \ \forall k \in \{0 \ldots \Delta-1\}$$

Moving to step 86, the probability that each pixel intensity represents a portion of the target 22 is calculated and mapped to create P(k). Using the smoothed histograms, the probability is defined as the ratio of the number of occurrences of a particular pixel intensity in the inner region to the total number of occurrences of such pixel intensity in both the inner and outer regions. This ratio, also known as the Baysian probability ratio, can be calculated as follows:

$$P(k) = \frac{H_s^I(k)}{H_s^I(k) + H_s^O(k)} \ \forall k \in \{0 \ldots \Delta-1\}$$

As is indicated in step 88, the probability map P(k) generated in step 86 is then shaped. The shaping function is performed in order to reduce the contribution to the centroid calculation for the target 22 of those pixels that have only a moderate 30 probability of representing a portion of the target 22. In one embodiment of the present invention, 2 shaping functions are actually applied. The first shaping function clips to zero those pixels having only a moderate probability of representing a portion of the target 22. The second shaping function raises pixels likely to be a portion of the target to a power. The shaped probability map $P_s(k)$ can be calculated as shown below, where $N_p$ and $P_T^{min}$ are once again established system parameters:

$$P_S(k) = \begin{cases} P(k) \geq P_T^{min} \Rightarrow P(k)^{N_p} \\ P(k) < P_T^{min} \Rightarrow 0 \end{cases} \forall k \in \{0 \ldots \Delta-1\}$$

Moving now to step 90, the shaped probability map, $P_s(k)$ is used by the pixel processor to determine the weight to place on each image pixel, the weighted image pixels then being used to calculate the centroid of the target 22. The centroid is calculated across the track region 42 in azimuth and elevation in accordance with the following equations:

$$E_c = \sum_{r=R_t^T}^{R_b^T} \sum_{c=C_l^T}^{C_r^T} c P_s(I_{r,c})$$

$$E_r = \sum_{r=R_t^T}^{R_b^T} \sum_{c=C_l^T}^{C_r^T} r P_s(I_{r,c})$$

$$M = \sum_{r=R_t^T}^{R_b^T} \sum_{c=C_l^T}^{C_r^T} P_s(I_{r,c})$$

$$Centroid_c = \frac{E_c}{M}$$

$$Centroid_r = \frac{E_r}{M}$$

In addition to calculating the centroid of the target 22 as indicated in step 92, the pixel processor 30 also counts the number of pixels representing the target 22 that are located in the track region 50 and the outer region 48. The pixel processor 30 uses the shaped probability map generated by the probability map generator 32 to calculate the counts. In one embodiment of the present invention, the pixel processor 30 uses the following equations to determine these counts:

$$D^T = \sum_{r=R_t^T}^{R_b^T} \sum_{c=C_l^T}^{C_r^T} \begin{cases} P_s(I_{r,c}) \geq P_T^{sil} \Rightarrow 1 \\ P_s(I_{r,c}) < P_T^{sil} \Rightarrow 0 \end{cases}$$

$$D^O = \sum_{r=R_t^O}^{R_b^O} \sum_{c=C_l^O}^{C_r^O} \begin{cases} P_s(I_{r,c}) \geq P_T^{sil} \Rightarrow 1 \\ P_s(I_{r,c}) < P_T^{sil} \Rightarrow 0 \end{cases}$$

In another embodiment, the equations below could be employed. However, this embodiment may be more sensitive to the occurrence of pixels representing clutter in the inner region 46 and the outer region 48.

$$D^T = \sum_{r=R_t^T}^{R_b^T} \sum_{c=C_l^T}^{C_r^T} P_s(I_{r,c})$$

$$D^O = \sum_{r=R_t^O}^{R_b^O} \sum_{c=C_l^O}^{C_r^O} P_s(I_{r,c})$$

Finally, as is indicated in step 94, the pixel processor 30 determines the silhouette of the target 22 over the track region 50. The silhouette is defined as the rectangular region that bounds those pixels within the image, which have a high probability of being part of the target 22. The pixel processor 30 again uses the shaped probability map created by the probability map generator to determine the silhouette, which extends from 4ow $S_t$ to row $S_b$, and column $S_l$ to column $S_r$, in accordance with the following equations:

$$S_r = \underset{r=R_t^T}{\overset{R_b^T}{Max}} \underset{c=C_l^T}{\overset{C_r^T}{Max}} \begin{cases} P_s(I_{r,c}) \geq P_T^{sil} \Rightarrow c \\ P_s(I_{r,c}) < P_T^{sil} \Rightarrow C_l^T \end{cases}$$

$$S_l = \underset{r=R_l^T}{\overset{R_b^T}{\text{Min}}} \underset{c=C_l^T}{\overset{C_r^T}{\text{Min}}} \begin{cases} P_s(I_{r,c}) \geq P_T^{sil} \Rightarrow c \\ P_s(I_{r,c}) < P_T^{sil} \Rightarrow C_r^T \end{cases}$$

$$S_b = \underset{r=R_l^T}{\overset{R_b^T}{\text{Max}}} \underset{c=C_l^T}{\overset{C_r^T}{\text{Max}}} \begin{cases} P_s(I_{r,c}) \geq P_T^{sil} \Rightarrow r \\ P_s(I_{r,c}) < P_T^{sil} \Rightarrow R_t^T \end{cases}$$

$$S_t = \underset{r=R_l^T}{\overset{R_b^T}{\text{Min}}} \underset{c=C_l^T}{\overset{C_r^T}{\text{Min}}} \begin{cases} P_s(I_{r,c}) \geq P_T^{sil} \Rightarrow r \\ P_s(I_{r,c}) < P_T^{sil} \Rightarrow R_b^T \end{cases}$$

The Min and Max included in the equations above are operators that determine the minimum and maximum values within a range of values.

Generally, steps 80 through 94 are performed in a recursive manner on a per frame basis. In other words, the probability map is calculated or created from the histograms collected from frame N of the image. The probability map created from the image of frame N is then used to calculate the aforementioned target metrics (centroid, pixel counts, and silhouette) for the next frame of the image, i.e., frame N+1.

As is evident from the detailed discussion above, the present invention results in an imaging tracker that is capable of discriminating a target from background within collected image data without the selection of discrete thresholds. Instead, the present invention makes direct use of the probability that a pixel is representative of the target in calculating not only the target centroid, but also the target silhouette and the number of pixels within the inner and outer regions that represent the target. The aforementioned metrics are used by the remainder of the system to maintain an image sensor on the target in order to track the target's movement.

Although particular embodiments of the invention have been described in detail, it is understood that the invention is not limited correspondingly in scope, but includes all changes, modifications and equivalents coming within the spirit and terms of the claims appended hereto.

What is claimed is:

1. A system for tracking a target comprising:
   (a) an image sensor mounted to a gimbal for acquiring an image, wherein the image includes a plurality of pixels representing the target and a background;
   (b) a motor for rotating the gimbal; and
   (c) an autotracker electrically coupled to the image sensor and the motor, the autotracker including:
      (i) a probability map generator for computing a probability that each of the plurality of pixels having a particular intensity is either a portion of the target or a portion of the background;
      (ii) a pixel processor in communicative relation with the probability map generator for calculating a centroid of the target based upon the probabilities computed by the probability map generator; and
      (iii) a controller in communicative relation with the pixel processor for generating commands to the motor based upon the centroid.

2. A system according to claim 1, wherein the probability map generator creates a map of the computed probabilities.

3. A system according to claim 2, wherein the probability map generator shapes the map in order to reduce the effect on the calculation of the centroid of those pixels that make up a portion of the background.

4. A system according to claim 1, wherein the pixel processor calculates a silhouette of the target based upon the probabilities computed by the probability map generator.

5. A system according to claim 4, wherein the autotracker system further includes a gate controller in communicative relation with the pixel processor, the gate controller using the silhouette to size an inner gate and the centroid to locate the gate around the target.

6. A system according to claim 5, wherein the gate controller positions a track gate and an outer gate in concentric relation with the inner gate, the track gate and the outer gate being a predetermined number of pixels larger than the inner gate.

7. A system according to claim 6, wherein the pixel processor calculates the number of pixels representing the target that are located in a first region between the outer gate and the track gate, the calculation being based on the probability computed by the probability map generator.

8. A system according to claim 7, wherein the pixel processor calculates the number of pixels representing the target that are located in a second region between the track gate and the inner gate, the calculation being based on the probability computed by the probability map generator.

9. A system according to claim 8, further comprising a status processor in communicative relation with the pixel processor, the status processor determining a quality of the system's track of the target based upon the silhouette and the number of pixels representing the target that are determined to be located in the first region and the second region.

10. A system according to claim 1, wherein the autotracker is implemented on at least one microprocessor.

11. A method of transitioning an imaging target tracker from an initialization mode to a tracking mode comprising the steps of:
    (a) maintaining an image sensor on the target through manual manipulation of the image sensor;
    (b) centering a plurality of gates on an image detected by the image sensor, the image being made up of a plurality of pixels;
    (c) selecting a range of consecutive intensities for the plurality of pixels that have a probability of representing the target;
    (d) generating a probability map based upon the selected range of consecutive intensities; and
    (e) generating at least two initial histograms based upon the selected range of consecutive intensities.

12. A method according to claim 11, wherein the step of generating includes assigning a value of either zero or one to the probability that a particular intensity within the selected consecutive range of intensities represents a portion of the target.

13. A method of tracking a target using an image captured by an image sensor comprising the steps of:
    (a) computing a probability that a particular intensity of a pixel within the image is representative of the target;
    (b) calculating a centroid of the target based upon the computed probability; and
    (c) manipulating the image sensor based upon the calculated centroid so as to maintain a line of sight of the image sensor on the target
    wherein the step of calculating the centroid includes using the computed probability for each pixel to determine a weight to place on the pixel in calculating the centroid.

14. A method according to claim 13, wherein the step of calculating includes calculating first moments of the target centroid and weighting the first moments with the computed probability.

15. A method according to claim 13, wherein the step of manipulating includes generating commands based upon the calculated centroid and providing the commands to motors operatively connected to a rotatable mechanism on which the image sensor is mounted.

16. A method according to claim 13, further comprising the step of determining a silhouette of the target based upon the computed probability.

17. A method according to claim 16, further comprising the step of calculating a size of an inner gate based upon the silhouette and locating the inner gate based upon the calculated centroid.

* * * * *